United States Patent
Iotti

(10) Patent No.: US 9,845,405 B2
(45) Date of Patent: Dec. 19, 2017

(54) COATING COMPOSITION OF NANO CELLULOSE, ITS USES AND A METHOD FOR ITS MANUFACTURE

(71) Applicant: Paper and Fibre Research Institute, Trondheim (NO)

(72) Inventor: Marco Iotti, Lausanne (CH)

(73) Assignee: PAPER AND FIBRE RESEARCH INSTITUTE, Trondheim (NO)

( * ) Notice: Subject to any disclaimer, the term of this patent is extended or adjusted under 35 U.S.C. 154(b) by 475 days.

(21) Appl. No.: 14/430,874

(22) PCT Filed: Sep. 24, 2013

(86) PCT No.: PCT/EP2013/069856
§ 371 (c)(1),
(2) Date: Mar. 24, 2015

(87) PCT Pub. No.: WO2014/044870
PCT Pub. Date: Mar. 27, 2014

(65) Prior Publication Data
US 2015/0225590 A1    Aug. 13, 2015

(30) Foreign Application Priority Data

Sep. 24, 2012 (SE) ...................................... 1251076

(51) Int. Cl.
| | |
|---|---|
| *C09D 101/02* | (2006.01) |
| *B41M 5/52* | (2006.01) |
| *C09D 101/00* | (2006.01) |
| *C09D 101/04* | (2006.01) |
| *C09D 101/06* | (2006.01) |
| *D21H 19/34* | (2006.01) |
| *D21H 19/12* | (2006.01) |
| *C08K 5/17* | (2006.01) |
| *C08K 5/19* | (2006.01) |

(52) U.S. Cl.
CPC ......... *C09D 101/02* (2013.01); *B41M 5/5236* (2013.01); *C08K 5/17* (2013.01); *C08K 5/19* (2013.01); *C09D 101/00* (2013.01); *C09D 101/04* (2013.01); *C09D 101/06* (2013.01); *D21H 19/12* (2013.01); *D21H 19/34* (2013.01); *Y10T 428/31971* (2015.04); *Y10T 428/31982* (2015.04)

(58) Field of Classification Search
CPC .. C09D 101/02; C09D 101/00; C09D 101/06; B41M 5/5236; C08K 5/17; C08K 5/19; D21H 19/12; D21H 19/34; Y10T 428/31971; Y10T 428/31982
USPC ....................................................... 428/537.5
See application file for complete search history.

(56) References Cited

U.S. PATENT DOCUMENTS

| | | | |
|---|---|---|---|
| 2010/0009897 A1 | 1/2010 | Tanaka et al. | |
| 2010/0272980 A1* | 10/2010 | Kowata | C08B 11/02 428/220 |
| 2011/0081554 A1* | 4/2011 | Ankerfors | C09D 101/02 428/535 |
| 2012/0205065 A1* | 8/2012 | Esser | D21H 17/42 162/164.6 |

FOREIGN PATENT DOCUMENTS

| | | | |
|---|---|---|---|
| JP | 58-191296 | | 11/1983 |
| WO | WO2008/008576 | * | 4/2008 |
| WO | WO2010/003860 | * | 1/2010 |
| WO | WO 2010/003860 A2 | | 1/2010 |
| WO | WO 2011/056130 A1 | | 5/2011 |

OTHER PUBLICATIONS

Office Action issued in Chinese Patent Application No. 201380049182.5, dated Mar. 29, 2016 (English translation only).
Lu, "Quaternary ammonium cationic surfactant," China Surfactant Detergent & Cosmetics, No. 4, pp. 30-34 (Aug. 29, 1981).
Aulin, et al. 2010 "Oxygen and oil barrier properties of microfibrillated cellulose films and coatings" *Cellulose*; 17(3): 559-574.
Lavoine, et al. 2012 "Microfibrillated cellulose—Its barrier properties and applications in cellulosic materials: A review" *Carbohydrate Polymers*, 90(2): 735-764.
Syverud, et al. 2009 "Strength and barrier properties of MFC films" *Cellulose*, 16(1): 75-85.
Syverud, et al. 2010 "Films made of cellulose nanofibrils: surface modification by adsorption of a cationic surfactant and characterization by computer-assisted electron microscopy" *Journal of Nanoparticle Research*, 13(2): 773-782.
Xhanari, et al. 2010 "Reduction of water wettability of nanofibrillated cellulose by adsorption of cationic surfactants" *Cellulose*, 18(2): 257-270.

\* cited by examiner

*Primary Examiner* — Leszek Kiliman
(74) *Attorney, Agent, or Firm* — Knobbe, Martens, Olson & Bear LLP

(57) ABSTRACT

The invention relates to an aqueous coating composition of nano cellulose (e.g., microfibrillated cellulose), characterized in that has a dry matter concentration of 2%-12% of nano cellulose and comprises at least one cationic surfactant, which may be chosen among Hexadecyltrimethyl-ammonium bromide, Octadecyltrimethyl-ammonium bromide, Hexadecylpyridinium chloride and Tetradecyl trimethylammonium bromide, Dodecyl pyridinium chloride. The invention also pertains to use of the composition as a coating layer and as an oxygen barrier layer. Further it relates to substrates, e.g., board, cardboard or paper coated with the composition. Moreover, the invention pertains to a process for preparing the coating composition.

20 Claims, 5 Drawing Sheets

COATING COMPOSITION OF NANO CELLULOSE, ITS USES AND A METHOD FOR ITS MANUFACTURE

FIELD OF INVENTION

The present invention relates to an aqueous coating composition of nano cellulose, characterized in that it has a concentration of 2-12% of nano cellulose dry matter by weight of the composition and comprises at least one cationic surfactant.

The invention also pertains to use of the composition as a coating layer, especially as an oxygen barrier or smoothing layer. A substrate, e.g. board, cardboard, printing paper or a liquid packaging board coated with the composition is also encompassed by the invention. Moreover, a process for the manufacture of the composition is disclosed.

TECHNICAL BACKGROUND

The production and characterization of nano cellulose e.g. certain types of microfibrillated cellulose from wood fibers was described by Turbak et al. [1] and Herrick et al. [2] in the 1980s. Nano cellulose was obtained by forcing a cellulose fibers suspension through a mechanical communition device at high pressure. The procedure resulted in the production of gel-like water dispersions with a nano cellulose concentration of 1% w/w, or lower, with high aspect ratio [1-3].

Because of the unique characteristics of nano cellulose fibrills, such as a very high specific surface area, and the formation of a highly porous gel-like network, an extensive amount of research has been conducted on nano cellulose in the last 30 years. Several recent publications demonstrate how nano cellulose can be used for various purposes within the materials field, such as constituting reinforcement in nanocomposites dispersion stabilizers, constituting antimicrobial films, filtration media, and oxygen barrier material in food and pharmaceutical applications [4, 5].

WO2010/003860 discloses liquid cleansing compositions comprising nano cellulose and surfactant, but does not relate to coatings.

US2012/0205065 discloses addition of aqueous nano cellulose to paper stock for the preparation of paper with high dry strength. The document does not relate to coatings.

US 2010/0272980 relates to a fiber composite for a substrate. A dispersion of microfibrillated cellulose fibers is disclosed, wherein the dispersion medium may be water, and the dispersion medium may further comprise a surfactant.

WO 2008008576 discloses a water-based formulation comprising a water-based polymer and a fiber, which can be micro fibrillated cellulose fiber. The formulation may also comprise surfactants.

US2011/0081554 discloses a nano cellulose coating composition comprising 1-90% nano cellulose dispersion, but does not disclose use of any surfactant. Likewise, WO2011/056130 discloses the use of nano cellulose in a coating, but does not disclose the use of any surfactant.

Low water and gas permeability is crucial for a lot of food packaging and low oxygen transmission is one of the main requirements. To meet this demand paper based packaging are laminated with aluminium or extrusion coated with synthetic polymers such as ethyl vinyl alcohol (EVOH) in one or several thin layers.

An emerging trend in the packaging sector is the creation of a barrier on packaging paper and packaging board, by the use of biodegradable coating(s). The oxygen barrier property of nano cellulose is of particular interest for paper based packaging, and opens up new packaging solutions based on renewable and sustainable sources.

Nano cellulose can be applied as a coating with paper or paperboard as substrate, due to its gel-like behaviour, its chemical compatibility with the substrate and the possibility of dispersing nano cellulose in water. The nano cellulose coating applications, as compared with lamination applications, have the advantages of good adhesion and no need for adhesive, which implies cost reduction.

However, even though the rheological characteristics of nano cellulose suspensions are fundamental for possible utilization thereof in the materials and food industries (e.g. in coatings, as thickening agent, in extrusion processes), little has been published. Herrick et al. [2], who first studied the rheological behaviour of nano cellulose, discovered a pseudo-plastic (shear thinning) behaviour of a 2% water dispersion of nano cellulose.

An article by Iotti et al. (2010) [6] studied nano cellulose water dispersions at various concentrations (1-4% w/w) at temperatures between 25 and 60° C. Nano cellulose was shown to form gels at low concentration in water and exhibit a shear thinning behaviour with decreased viscosity, on shearing.

Coatings of a paper-based substrate with a nano cellulose dispersion are known to exhibit excellent properties with respect to low oxygen permeation and are also environmentally friendly, being cellulose-based.

JP58191296 discloses a coating composition comprising an aqueous dispersion of vinyl polymer and/or resin containing micro-fibrillated cellulose. The composition may also comprise a surfactant.

In an article by Xhanari [7] is described the use of the surfactant CTAB in combination with nanofibrillated cellulose or microfibrillated cellulose. The concentration of the fiber suspensions before fibrillation for two batches was 0.4% w/v.

Due to the properties of nano cellulose, nano cellulose dispersions are very difficult to concentrate without obtaining aggregates of the fibrils. Furthermore, concentrated nano cellulose dispersions commonly have a high viscosity making them difficult to handle industrially.

The high network forming capability of nano cellulose water dispersions is dependent on the temperature and the nano cellulose concentration. The viscosity decreases with increasing temperature and increases with increasing nano cellulose concentration [6].

The advent of nano cellulose fibril aggregation at higher nano cellulose concentration levels makes it a challenge to obtain high viscosity and low concentration nano cellulose dispersions.

Problems of high viscosity and low concentration are present in industry and there is a strong need for highly concentrated nano cellulose water-based coatings and a process for their use, to allow for lower energy consumption in drying process steps.

SUMMARY OF THE INVENTION

The inventors have surprisingly found that by treating nanocellulose materials (e.g. microfibrillated cellulose) with certain cationic surfactant(s) it is possible to increase the concentration of nano cellulose dispersions and still obtain a stable dispersion. It has also been proven possible to reduce the viscosity of the nano cellulose dispersion such that the combination of lowered viscosity and increased nano cellulose concentration will allow efficient coating directly on substrate material. The nano cellulose dispersion of the invention holds good oxygen barrier properties after drying on the paper or paperboard.

The invention relates to an aqueous coating composition of nano cellulose, characterized in that it has a dry matter concentration of 2-12% nano cellulose by weight of the composition, and comprises at least one cationic surfactant. None of the above prior art documents discloses such a composition.

The invention further relates to use of the coating composition as a coating layer, and a substrate coated with the composition, such as board, cardboard, printing paper, and liquid packaging board.

Finally, the invention also relates to a process for preparing the composition.

SHORT DESCRIPTION OF THE FIGURES

DETAILED DESCRIPTION OF THE INVENTION

Figure 1:
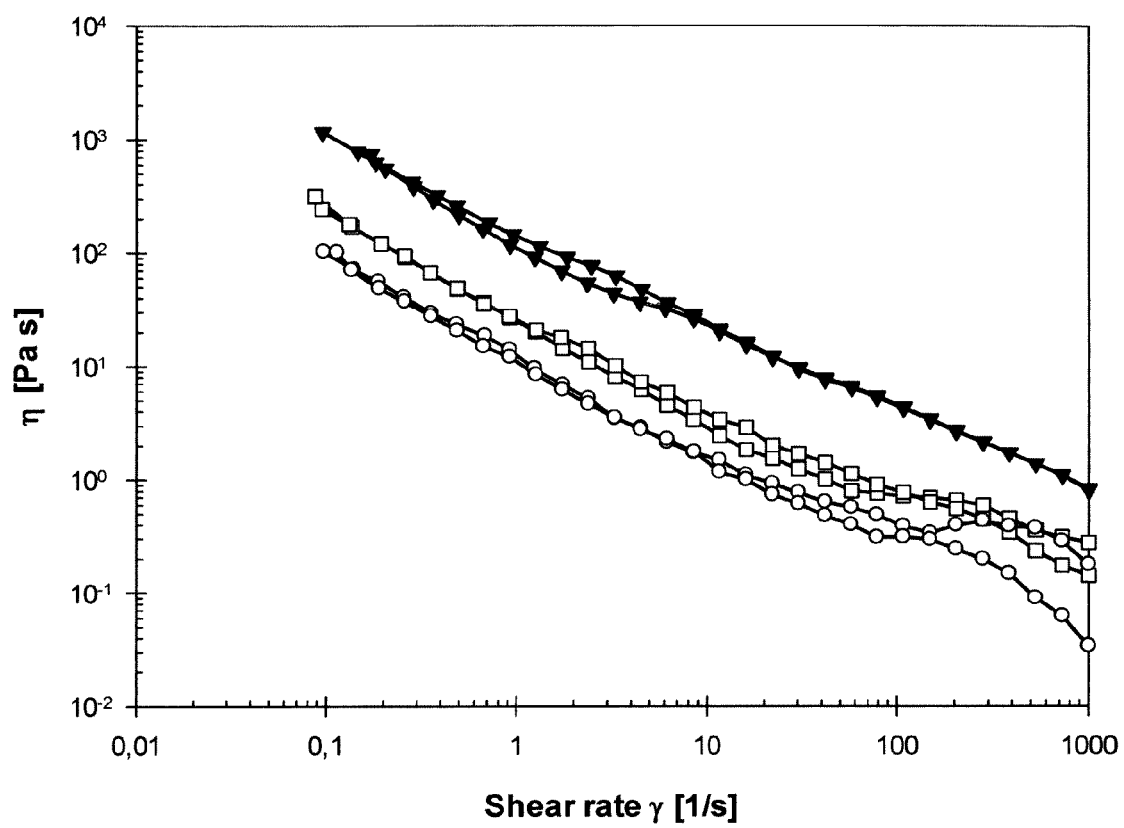
FIG. 1 shows the viscosity vs shear rate, for 2% w/w nano cellulose (filled triangles); 4.59% w/w nano cellulose with an addition of 20% w/w CTAB (open squares); and 5.55% w/w nano cellulose with an addition of 10% w/w CTAB (open circles), respectively.

The invention relates to an aqueous coating composition of nano cellulose, characterized in that it has a concentration of 2-12% dry matter nano cellulose by weight of the composition and comprises at least one cationic surfactant.

According to one embodiment the concentration (w/w) of nano cellulose is from above 4% to 12%, e.g. 4%-10%, e.g. 4%-8%, e.g. 4.1%-8%, such as 4.1%-8%, 4.5%-8%, 5%-8%, 5.5%-8%, 5%-8%, 5%-8%.

Throughout herein, nano cellulose contents are stated as % by weight of nano cellulose dry matter, on nano cellulose dispersion total weight, i.e. composition weight (unless specified otherwise).

Nano cellulose according to the invention may be microfibrillated cellulose manufactured through homogenization.

According to one embodiment the at least one cationic surfactant comprises an $N^+$ atom.

According to one embodiment the at least one cationic surfactant is a quaternary ammonium halide.

According to another embodiment the cationic surfactant is chosen from compounds having formula I

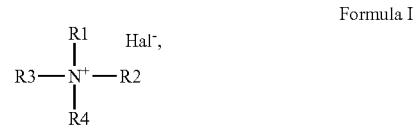

Formula I wherein $R_1$, $R_2$ and $R_3$ are independently an alkyl group $C_nH_{2n+1}$ and n is an integer from 1 to 20, or $R_1$ and $R_2$ designate, together with the $N^+$ atom to which they are bound, a saturated or unsaturated ring with 6 members, whereby $R_3$ is nothing or an alkyl group $C_mH_{2m+1}$;

$R_4$ is an alkyl group $C_mH_{2m+1}$ and m is an integer from 1 to 20;

$Hal^-$ is a halogen ion chosen from chloride, bromide, iodide and fluoride ions.

n may be 1, 2, 3, 4, 5, 6, 7, 8, 9, 10, 11, 12, 13, 14, 15, 16, 17, 18, 19 or 20 or any interval created by any of these integers, such as 1-4 or 2-8.

m may be 1, 2, 3, 4, 5, 6, 7, 8, 9, 10, 11, 12, 13, 14, 15, 16, 17, 18, 19 or 20 or any interval created by any of these integers, such as 1-4 or 2-8 or 5-20 or 10-20.

$R_1$ and $R_2$ may, together with the $N^+$ atom to which they are bound, designate a pyridinium cation.

The cationic surfactant may be chosen among
Hexadecyltrimethylammonium bromide (CTAB);
Octadecyltrimethylammonium bromide (OCTAB);
Hexadecylpyridinium chloride (HPYCL);
Tetradecyltrimethylammonium bromide (TTAB);
Dodecylpyridinium chloride (DPC).

According to one embodiment the composition comprises one, two, three, four or all of the cationic surfactants CTAB, OCTAB, HPYCL, TTAB and DPC.

The total surfactant(s) concentration may be in the interval from 0.5% to 50% counted as weight on weight on nano cellulose dry matter, e.g. 1%-50%, 1%-20%, 1%-30%, 2%-30%, 2%-20%, 3%-20%, 4%-20%, 5%-15%, 6%-10%.

The surfactant concentrations are always counted as weight on weight on nano cellulose dry matter, unless specifically defined otherwise.

According to one embodiment, the concentration of CTAB is from 0.5%-50%.

According to another embodiment the concentration of CTAB is from 0.5%-40%.

According to yet an embodiment, the concentration of CTAB is from 0.5%-30%.

According to another embodiment the concentration of CTAB is from 0.5%-25%.

According to another embodiment the concentration of CTAB is from 4%-20%, or 5%-15%, or 6%-10%.

According to one embodiment, the concentration of OCTAB is from 0.5%-50%.

According to another embodiment the concentration of OCTAB is from 0.5%-40%.

According to yet an embodiment, the concentration of OCTAB is from 0.5%-30%.

According to another embodiment the concentration of OCTAB is from 0.5%-25%.

According to another embodiment the concentration of OCTAB is from 4%-20%, or 5%-15%, or 6%-10%.

According to another embodiment, the concentration of HPYCL is from 0.5%-50%.

According to another embodiment the concentration of HPYCL is from 0.5%-40%.

According to yet an embodiment, the concentration of HPYCL is from 0.5%-30%.

According to another embodiment, the concentration of HPYCL is from 0.5%-25%.

According to another embodiment the concentration of HPYCL is from 4%-20%, or 5%-15%, or 6%-10%.

According to yet an embodiment, the concentration of TTAB is from 0.5%-50%.

According to another embodiment the concentration of TTAB is from 0.5%-40%.

According to yet another embodiment, the concentration of TTAB is from 0.5%-30%.

According to another embodiment the concentration of TTAB is from 0.5%-25%.

According to another embodiment the concentration of TTAB is from 4%-20%, or 5%-15%, or 6%-10%.

According to one embodiment, the concentration of DPC is from 0.5%-50%.

According to another embodiment the concentration of DPC is from 0.5%-40%.

According to yet an embodiment, the concentration of DPC is from 0.5%-30%.

According to another embodiment the concentration of DPC is from 0.5%-25%.

According to another embodiment the concentration of DPC is from 4%-20%, or 5%-15%, or 6%-10%.

The coating compositions of the invention have a high dry matter content, low viscosity and high film forming capability. Moreover, films formed from the composition have low oxygen permeability compared to ethyl vinyl alcohol, which is conventionally used.

Figure 2:
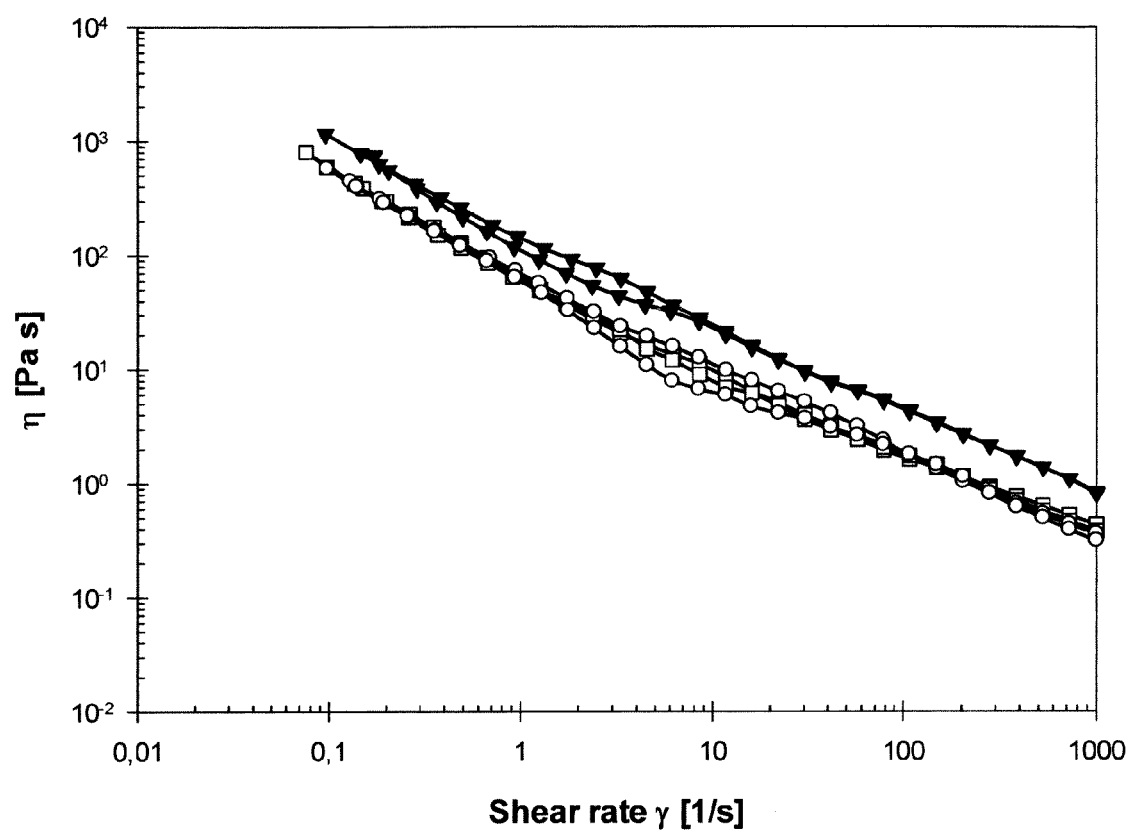
FIG. 2 shows viscosity vs shear rate, for 2% w/w nano cellulose (filled triangles); 2.99% w/w nano cellulose with an addition of 15% w/w OCTAB (open squares); and 3.84% w/w nano cellulose with an addition of 5% w/w OCTAB (open circles), respectively.
Figure 3:
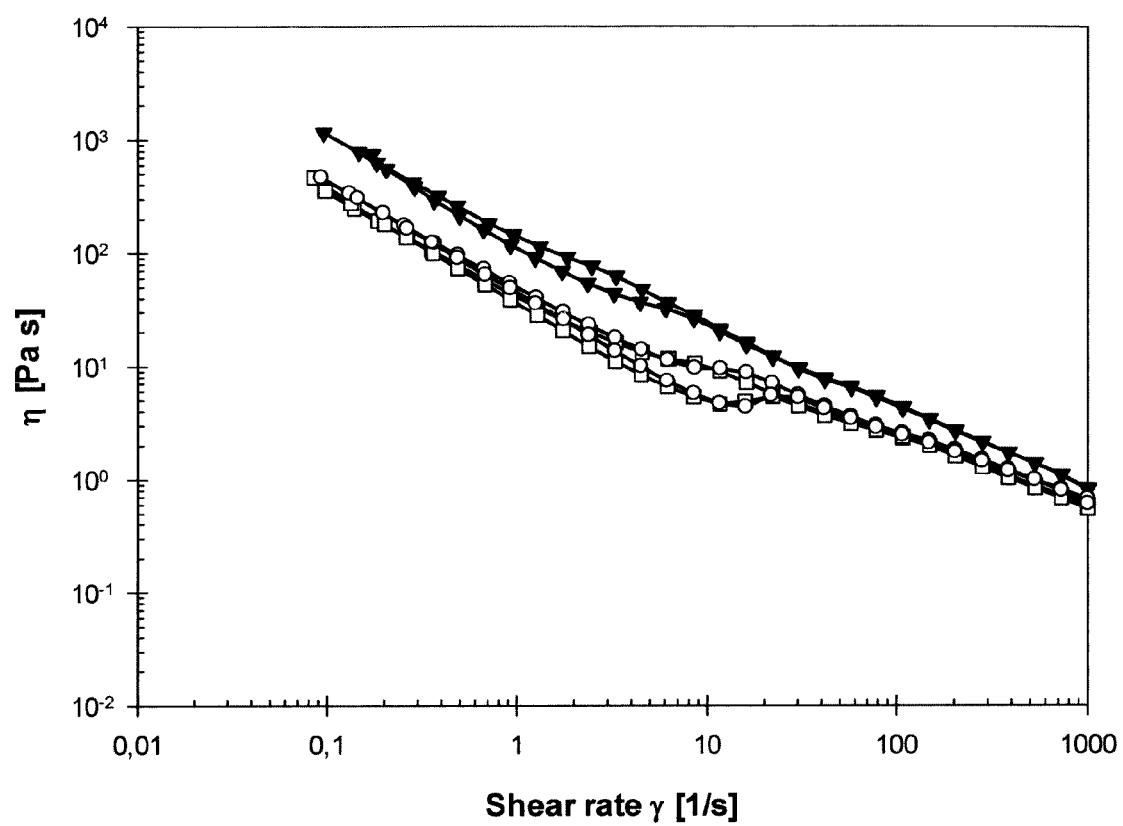
FIG. 3 shows viscosity vs shear rate, for 2% w/w nano cellulose (filled triangles); 2.74% w/w nano cellulose with an addition of 4% w/w HPYCL (open circles); and 2.55% w/w nano cellulose with an addition of 8% w/w HPCYL (open squares), respectively.
Figure 4:
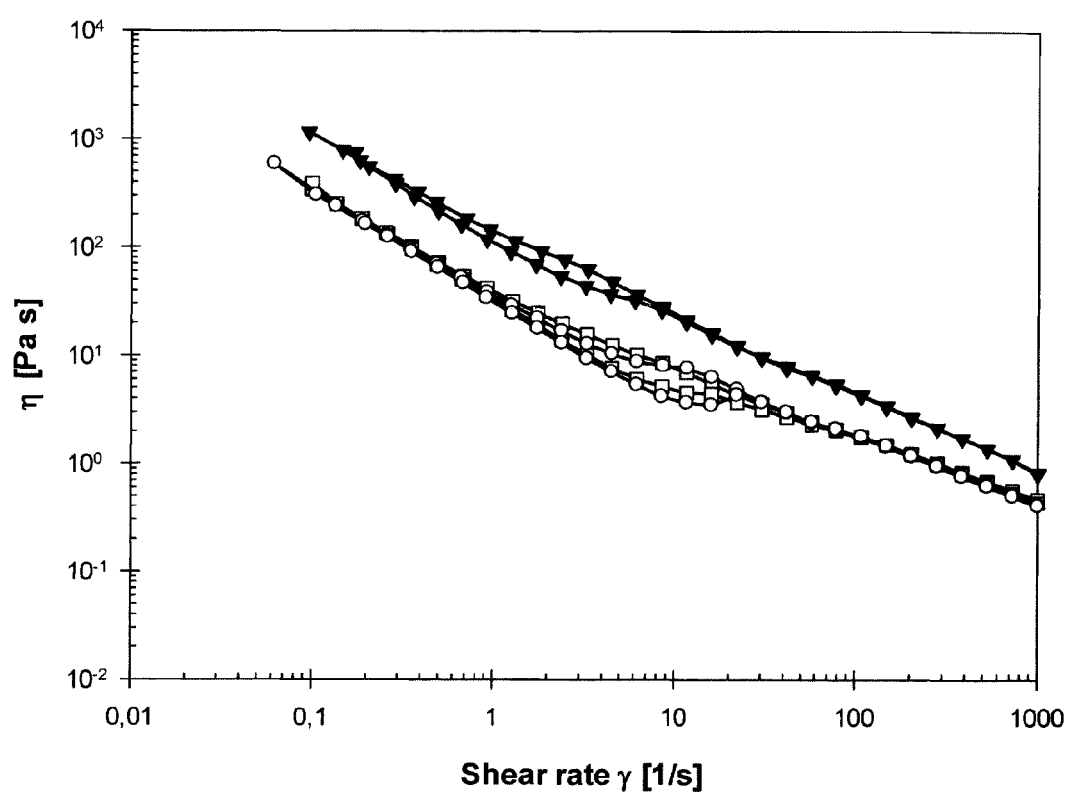
FIG. 4 shows viscosity vs shear rate, for 2% w/w nano cellulose (filled triangles); 2.33% w/w nano cellulose with an addition of 3% w/w TTAB (open circles); and 2.67% w/w nano cellulose with an addition of 12% w/w of TTAB (open squares), respectively.
Figure 5:
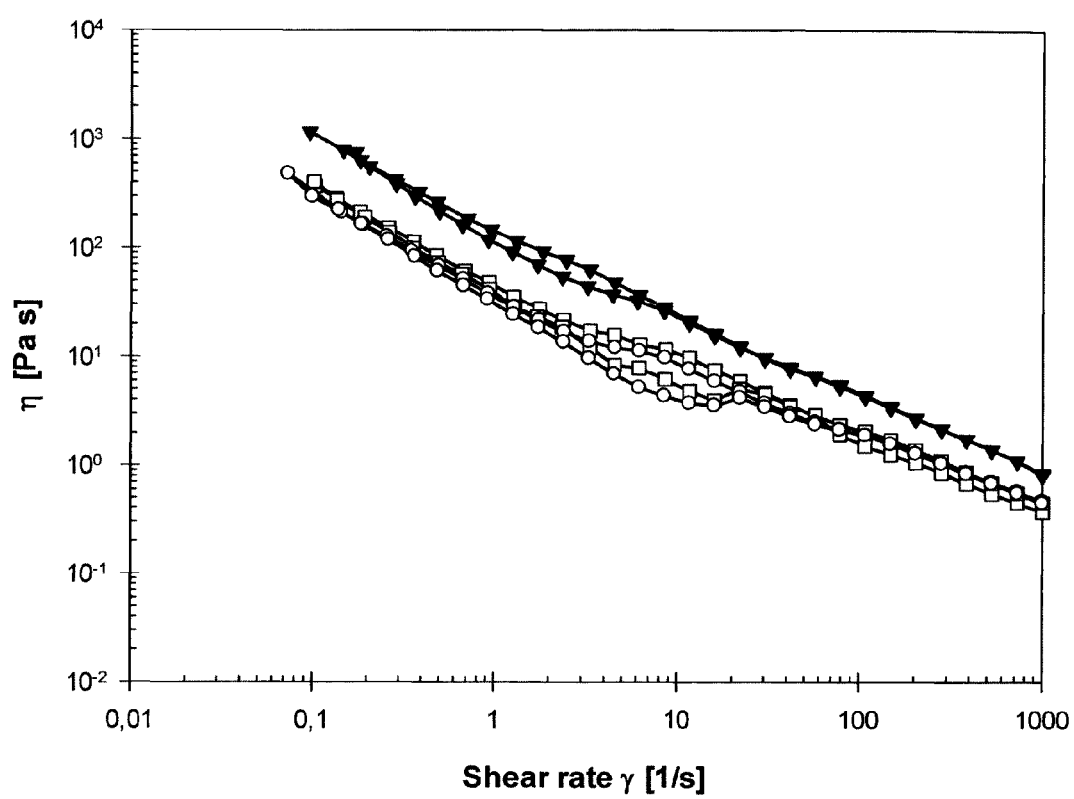
FIG. 5 shows viscosity vs shear rate, for 2% w/w nano cellulose (filled triangles); 2.24% w/w nano cellulose with an addition of 10% w/w dodecyl pyridinium chloride (DPC; open circles); and 4.03% w/w nano cellulose with an addition of 20% w/w DPC (open squares), respectively.

The cationic surfactants according to the invention have the capability of reducing the hydrogen bond strength between the nano cellulose fibrins, and hence the viscosity of the composition. Rheology measurements of several nano cellulose dispersions, as set forth in FIGS. 1-5, show that the viscosities of samples according to the invention are all lower than the 2% nano cellulose reference samples without surfactant(s). Moreover, all samples according to the invention have a higher amount of nano cellulose dry matter than the reference samples.

The above relationship between viscosity and dry matter of the inventive compositions is different from the common behaviour of nano cellulose water dispersions, wherein the viscosity profile is enhanced with increments of dry matter content [5,6].

It is for example, in accordance with the invention, possible to obtain samples with a nano cellulose dry matter concentration up to 5.5% (e.g. sample containing 10% CTAB), without there being any signs of aggregation and with very low viscosity of the sample. Absence of aggregation of the aqueous cellulose dispersion is a sign that the composition is stable, as understood by the person skilled in the art.

The compositions according to the invention are stable after storage for several weeks.

The surfactant-neutralizing effect of the strong attraction between fibrins and the ensuing reduction of the structure forming effect commonly exhibited in nano cellulose water dispersions may explain the finding that all samples according to the invention have a similar rheology characteristic, irrespective of nano cellulose concentration.

The viscosity reduction is similar for samples with differing nano cellulose concentration.

Moreover, an increased surfactant(s) amount does not necessarily further reduce the viscosity of the nano cellulose dispersion. The surfactant may hence be used in minor amount.

The composition may further comprise at least one additive other than a cationic surfactant in order to improve the mechanical properties of the films and coatings. The additive may be chosen from polymers such as carbohydrates, e.g. hemicelluloses, and plasticizers, e.g. triethyl citrate. The addition of triethyl citrate helps in the production of a stable and ductile film and/or coating layer.

With the compositions of the invention can be obtained coatings on fiber based substrates, such as paper, paperboard, cardboard, printing paper, that have a high dry matter content with low viscosity and high film forming capability. Coating blends with a total dry nano cellulose content in the interval from 2 to 7% by weight, e.g. 5.5% by weight, may be obtained according to the invention. Films formed from the composition exhibit good barrier properties, e.g. oxygen barrier properties, on fiber-based substrates such as board, cardboard, paper, printing paper. Hence, the composition may be coated on packages intended for oxygen-sensitive products such as food, beverages and pharmaceuticals. In one embodiment, a liquid packaging board is coated with the composition of the invention. Moreover, films formed from the composition may be used as a smoothing layer for e.g. board. Such smoothing layer would result in improved printing properties.

The compositions of the invention have high concentration of nano cellulose, low viscosity and allow low energy consumption in the drying process. They hence bring about an easier and more efficient application of water-based coatings.

The invention also regards a process for preparing a composition comprising 2-12%, e.g. from above 4 to 12%, of nano cellulose dry matter (w/w) and at least one cationic surfactant, wherein:
a) nano cellulose is prepared;
b) the obtained nano cellulose is optionally centrifuged or evaporated to a concentration in the interval of 1-6% dry matter by weight of the composition;
c) one or more cationic surfactants is added; and
d) the mixture is concentrated to a concentration in the interval of 2-12% dry matter by weight of the composition.

The composition prepared has low viscosity compared to the untreated nano cellulose dispersion. This makes the low viscosity composition possible to use for coating applications.

The pulp from which nano cellulose is prepared is cellulosic or lignocellulosic material.

The pulp is in accordance with the invention diluted using methods known in the papermaking art. Dilution of the pulp is performed in water to a concentration of 0.1%-5%, e.g. 0.2%-4%, such as 0.3%-1%, e.g. 0.2%-0.6% or 0.5% (w/w).

Nano cellulose may be prepared by any method known to the person skilled in the art. An exemplary method of nano cellulose manufacture is passing cellulose pulp, which may be diluted, through a homogenizer. That way, micro fibrillated cellulose is produced. The number of passages through the homogenizer would depend on process parameters known to the person skilled in the art, and may be any number in the interval from 1 to 15 passages.

The optional nano cellulose concentration step by centrifugation or evaporation may be performed using methods known to the person skilled in the art. Likewise, the final concentration step is performed by state of the art centrifugation or evaporation.

All publications mentioned herein are hereby incorporated by reference, to the fullest extent permitted by law. The invention will now be described by the following non-limiting examples.

EXAMPLES

Example 1a. Preparation of Microfibrillated Cellulose (Nano Cellulose)

The cellulose selected for the production of microfibrillated cellulose was bleached long fibre sulphate Kraft pulp from Södra (totally chlorine free fully bleached sulphate pulp mainly based on spruce). The Kraft pulp was mechanically treated in a Claflin conical refiner using 2,000 kWh/t specific energy consumption combined with homogenization. The homogenization was done using a high-pressure homogenizer (model 12.56 VH, APV, Rannie LAB) at 0.5-1% consistency using 5 passes and a pressure of 1,000 bar [8].

Example 1b Preparation of Microfibrillated Cellulose (Nano Cellulose)

The cellulose selected for the production of microfibrillated cellulose was bleached long fibre sulphate Kraft pulp from Södra (totally chlorine free fully bleached sulphate pulp mainly based on spruce). The Kraft pulp was mechanically treated in a Claflin conical refiner using 2,000 kWh/t specific energy consumption combined with homogenization. The homogenization was done using a high-pressure homogenizer (model 12.56 VH, APV, Rannie LAB) at 0.5-1% consistency using 5 passes and a pressure of 1,000 bar [8]

From the 0.5-1.0% water dispersion of nano cellulose produced by the homogenization process, the nano cellulose concentrations (1 to 4%) were obtained by either centrifugation or evaporation. Centrifugation was performed in a Heraeus 400R (Thermo Fisher Scientific Inc., Waltham, Mass., USA) at 2500 rpm during 60 minutes at 22° C. This treatment was repeated until a desired concentration of e.g. 1-4% was obtained.

Example 2. Preparation and Tests of Compositions According to the Invention

TABLE 1

Surfactants selected for test

| Code | Description |
| --- | --- |
| CTAB | Hexadecyltrimethylammonium bromide |
| OCTAB | Octadecyltrimethylammonium bromide |
| HPYCL | Hexadecylpyridinium chloride |
| TTAB | Tetradecyltrimethylammonium bromide |
| TEC | Triethyl citrate |
| DPC | Dodecylpyridinium chloride |

The water dispersion of nano cellulose of 1-4% (example 1b) were added cationic surfactants according to table 2, in accordance with principles known to the person skilled in the art. After surfactant addition, compositions were stirred for 10 minutes and composition pH adjusted to neutral pH (pH 6-7) by addition of HCl and/or NaOH. Compositions were evaporated at 75° C. in a stove to various dry matter content (2.24 to 5.55%.) A summary of samples prepared and tested for their rheology is shown in Table 2.

TABLE 2

Summarizing table of tests made on the different solutions

| Code for surfactant | Concentration of surfactant (w/w on nano cellulose dry matter) | Dry matter Nano cellulose (w/w) |
| --- | --- | --- |
| CTAB10 | 10% | 5.55% |
| CTAB20 | 20% | 4.59% |
| OCTAB5 | 5% | 3.84% |
| OCTAB15 | 15% | 2.99% |
| HPYCL4 | 4% | 2.74% |
| HPYCL8 | 8% | 2.55% |
| TTAB3 | 3% | 2.33% |
| TTAB12 | 12% | 2.67% |
| DPC10 | 10% | 2.24% |

Rheological Measurements

The low shear and oscillatory rheological properties of nano cellulose dispersions were measured on a Physica MCR-301 (Anton Paar GmbH, Graz, Austria) rotational rheometer, using the RheoPlus software. The Physica MCR-301 was used in controlled shear mode to test the shear rate/time dependency of the nano cellulose dispersions. The rheometer was equipped with a temperature controlled lower plate (ERD, PPTD200/62/TG) to keep the temperature at 25° C. A parallel plate geometry type was selected as the most appropriate for the measurements; a 50 mm diameter roughened plate (concentricity±5 µm and parallelity±2 µm) to prevent wall slip. The gap for the measurement was 1 mm and the sample was allowed to rest 10 min before starting the pre-shearing. Specific covers around samples and distilled water on the geometries were used to prevent sample drying due to the long running time and temperature.

Results

Rheological Characterization, Focused on the Low Shear Area.

Shear Controlled Mode Tests: Low Shear Rate Tests (figures showing viscosity as a function of shear rate).

The results from the addition of cationic surfactant(s) are shown in FIGS. 1 to 5. The nano cellulose concentrations of the different samples are not all 2%, due to the concentration method used (evaporation in stove). The 3 different pH values tested indicate that pH is immaterial. The reported results all relate to a test performed at neutral pH.

The high network forming capability of nano cellulose water dispersions is dependent on the concentration and the dispersion is decreasing on shear which indicates a shear-thinning behavior.

A shear dependent viscosity measurement is shown for all the compositions in the low shear rate area (0-1000 s$^{-1}$) and the results from the addition of cationic surfactant(s) are shown in FIGS. 1 to 5. It is clear from all samples shown in FIGS. 1 to 5, that the cationic surfactants(s) of the invention have the capability of reducing the viscosity of the nano cellulose composition at increased concentration of nano cellulose.

It is clear from all samples that the cationic surfactants(s) of the invention have the capability of reducing the viscosity of the nano cellulose composition.

Example 3. Film Production

Films from the prepared compositions were produced by a combination of free filtration and evaporation, as described in Syverud K and Stenius P [4], nano cellulose films were prepared from an approximately 0.1% w/w nano cellulose suspension poured into a cylindrical mould with a diameter of 6 cm. The bottom of the cylinder was a layered structure consisting of polyamide filter cloth, coarseness 235 mesh (top), a filter paper (middle) and a supporting Cu wire (bottom). Water was removed by free filtration as well as evaporation from the top. The basis weights of the films were 25 g/m$^2$, corresponding to thicknesses between 20-25 µm. The films were dried by evaporation at room temperature and could be easily removed from the filter after drying.

Example 4. Oxygen Permeability of Nano Cellulose Films

The oxygen barrier properties of nano cellulose films as prepared according to Example 3 were tested by measuring the OTR of nano cellulose films on an exposed surface of 5 cm$^2$, according to the standard ASTM F2622-08 (2008) by means of an Ox-Tran Model 1/50 (MOCON, 7500 Bonne Avenue North, Minneapolis, Minn. 55428 USA). Tests were run at 25 centigrade and RH 50%.

The oxygen permeability properties were tested by Oxygen Transmission Rate (OTR) in order to test the retention of the nano cellulose film oxygen barrier. The results are shown in Table 3.

TABLE 3

Oxygen transmission rate results of the nano cellulose films (20 g/m$^2$) as measured at 50% RH.

| Code | OTR (cc/m2/day) |
|---|---|
| CTAB10 | 5.58 |
| OCTAB5 | 18.65 |
| HPYCL4 | 5.17 |
| TTAB12 | 4.39 |
| TEC30 | 4.11 |

The uses of cationic surfactant (that decrease the viscosity) do not affect the film forming capability nor the oxygen barrier properties of the final film. The resultant films exhibit excellent oxygen barrier properties.

To increase the ductility of the nano cellulose films, plasticizer may be added to the composition. One possible plasticizer is tri ethyl citrate (TEC). Experiments have shown that this additive is one which exhibits the least modification of the rheological profile. Plasticizer is added to the surfactant, then the blend of plasticizer and surfactant is added to the nano cellulose water dispersion.

The results for samples incorporating TEC are basically identical to samples without any surfactant. Moreover, TEC as a plasticizer facilitates the production of a stable film, or coating. A film incorporating TEC becomes less brittle and resistant to bending. Herein, TEC has in combination with cationic surfactants and nano cellulose been shown to produce less brittle, highly bendable and high oxygen barrier films and coatings

Example 5. Coating of Nano Cellulose Composition on Cardboard in Laboratory Scale The nano cellulose compositions were prepared as described in Example 2. Surfactant and plasticizer making up the respective composition, the end concentration and the coating weight are listed in Table 4.

TABLE 4

Coating compositions and concentrations for the experiments

| Nano cellulose dispersion (1% w/w) | Surfactant w/w | Plasticizer w/w | Coating conc. (%) | Coating weight g/m$^2$ |
|---|---|---|---|---|
| A | HPYCL 4% | — | 5.7 | 19 |
| B | HPYCL 4% | *TEC 30% | 5.9 | 21 |
| C | CTAB 10% | — | 6.1 | 24 |
| D | CTAB 10% | *TEC 30% | 6.1 | 21 |

Cardboard (288 g/m$^2$) was coated with compositions as set forth in Table 4. The coating weight was calculated to be around 20 g/m$^2$; the real, final coating weights are reported in Table 4 Each coating composition was smut on the paperboard surface with spittle. After deposition, the samples were covered with thin meshed polyester and a heavy roll was passed back and forth to distribute the coating dispersion. The obtained sheets were then pressed at 5 bar for 5 minutes and subsequently dried under stress at 23° C. and 50% RH. At least 7 specimens were prepared in every series.

Example 6. Extrusion Coating of the Nano Cellulose Coated Cardboard

Cardboard coated with nano cellulose as described in example 5, was further extrusion coated with Polyethylene (PE). The coating weight of PE was 32 g/m$^2$ on top of the nano cellulose coating layer and 16 g/m$^2$ on the backside of the cardboard (e.g. the outside of a liquid packaging after converting). The nano cellulose coated cardboard sheets were flame treated on both sides before the PE extrusion coating and corona treated on the PE layer above the nano cellulose layer, to improve printability.

Example 7. Oxygen Transmission Rate of Two-Layered Coated Liquid Board

The oxygen barrier properties were tested by measuring the Oxygen Transmission Rate (OTR) of two specimens of layered coated cardboard (from example 7) on an exposed surface of 5 cm$^2$, according to the standard ASTM F2622-08 (2008) by means of an Ox-Tran Model 1/50 (MOCON, 7500 Bonne Avenue North, Minneapolis, Minn. 55428 USA). Tests were run at 25 centigrade and RH 50%. The oxygen permeability properties were tested by OTR in order to test the retention of the nano cellulose film oxygen barrier. The results are reported in Table 5.

TABLE 5

OTR of carton-board specimens

| Code | Surfactant & plasticizer | OTR (cc/m2/day) Average of two specimens |
|---|---|---|
| A | HPYCL 4% | 5.9 |
| B | HPYCL 4% + TEC 30% | 23.0 |
| C | CTAB 10% | 9.0 |
| D | CTAB 10% + TEC 30% | 25.0 |

REFERENCES

1. Turbak A F, Snyder F W, Sandberg K R (1983) J Appl Polym Sci: Appl Polym Symp 37:815-825.

2. Herrick F W, Casebier R L, Hamilton J K, Sandberg K R (1983) J Appl Polym Sci: Appl Polym Symp 37:797-813.
3. Nakagaito A N, Yano H (2004) Appl Phys A: Mater Sci Process 78(4): 547-552.
4 Syverud K, Stenius P (2009) Cellulose 16:75-85.
5. Klemm D, Kramer F, Moritz S, Lindström T, Ankerfors M, Gray D, Dorris (2011) Angew Chem Int 50:5438-5466.
6. Iotti M, Gregersen Ø, Moe S, Lenes M (2011) J Polym Environm, 19:137-145.
7. Klodian Xhanari; Kristin Syverud; Gary Chinga-Carrasco; Kristofer Paso; Per Stenius, Cellulose (2010) Kluwer Academic Publishers, Do, 18: 257-270.
8. Rodionova G, Lenes M, Eriksen Ø, Gregersen Ø (2010) Cellulose 18:127-134.

The invention claimed is:

1. Aqueous coating composition of nano cellulose, comprising a concentration of 2-12% of nano cellulose dry matter by weight of the composition and at least one cationic surfactant.

2. The composition according to claim 1, wherein the at least one cationic surfactant comprises an $N^+$ atom.

3. The composition according to claim 1, wherein the at least one cationic surfactant is selected from the group consisting of compounds having formula I

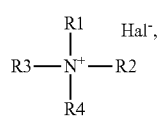

Formula I wherein
$R_1$, $R_2$ and $R_3$ are independently an alkyl group $C_nH_{2n+1}$ and
n is an integer from 1 to 20, or
$R_1$ and $R_2$ designate, together with the $N^+$ atom to which they are bound, a saturated or unsaturated ring with 6 members, whereby $R_3$ is nothing or an alkyl group $C_mH_{2m+1}$;
$R_4$ is an alkyl group $C_mH_{2m+1}$ and
m is an integer from 1 to 20;
$Hal^-$ is a halogen ion selected from the group consisting of chloride, bromide, iodide and fluoride ions.

4. The composition according to claim 1 wherein the at least one cationic surfactant is selected from the group consistent of:
Hexadecyltrimethylammonium bromide (CTAB);
Octadecyltrimethylammonium bromide (OCTAB);
Hexadecylpyridinium chloride (HPYCL);
Tetradecyltrimethylammonium bromide (TTAB); and
Dodecylpyridinium chloride (DPC).

5. The composition according to claim 1, wherein the total surfactant(s) concentration is in the interval from 0.5% to 50%, based on weight on weight of nano cellulose dry matter.

6. The composition according to claim 1, wherein the concentration of nano cellulose is 4%-8% dry matter by weight of the composition.

7. The composition according to claim 1, wherein the composition additionally comprises an additive selected from the group consisting of polymers and plasticizers.

8. A method of coating a substrate comprising applying a composition according to claim 1 as a coating layer to said substrate.

9. The method according to claim 8, wherein the composition is used as an oxygen barrier or smoothing layer.

10. Substrate coated with a composition according to claim 1.

11. The substrate according to claim 10 selected from the group consisting of fiber board and paper-based substrates.

12. Liquid packaging board coated with a composition according to claim 1.

13. A process for preparing a coating composition comprising 2-12% nano cellulose dry matter by weight of the composition and at least one cationic surfactant, comprising:
 a) preparing nano cellulose;
 b) optionally centrifuging or evaporating the obtained nano cellulose to a concentration in the interval of 1-6% dry matter by weight of the composition;
 c) adding the at least one cationic surfactants; and
 d) concentrating the mixture to a concentration in the interval of 2-12% dry matter by weight of the composition.

14. The process according to claim 13, wherein the at least one cationic surfactant comprises an $N^+$ atom.

15. The process according to claim 13, wherein the at least one cationic surfactant is a compound having formula I:

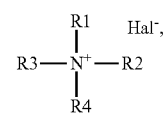

Formula I wherein
$R_1$, $R_2$ and $R_3$ are independently an alkyl group $C_nH_{2n+1}$ and
n is an integer from 1 to 10, or
$R_1$, and $R_2$ designate, together with the $N^+$ atom to which they are bound, a saturated or unsaturated ring with 6 members, whereby $R_3$ is nothing or an alkyl group $C_mH_{2m+1}$;
$R_4$ is an alkyl group $C_mH_{2m+1}$ and
m is an integer from 1 to 20;
$Hal^-$ is a halogen ion selected from the group consisting of chloride, bromide, iodide and fluoride ions.

16. The process according to claim 13, wherein the at least one cationic surfactant is selected from the group consisting of:
Hexadecyltrimethylammonium bromide (CTAB);
Octadecyltrimethylammonium bromide (OCTAB);
Hexadecylpyridinium chloride (HPYCL);
Tetradecyltrimethylammonium bromide (TTAB); and
Dodecylpyridinium chloride (DPC).

17. The process according to claim 13, wherein the at least one cationic surfactant is selected from the group consisting of:
Hexadecyltrimethylammonium bromide (CTAB);
Octadecyltrimethylammonium bromide (OCTAB);
Hexadecylpyridinium chloride (HPYCL);
Tetradecyltrimethylammonium bromide (TTAB); and
Dodecylpyridinium chloride (DPC).

18. The composition according to claim 7, wherein the polymer is a carbohydrate.

19. The composition according to claim 7, wherein the plasticizer is selected from the group consisting of a hemicellulose and triethyl citrate.

20. The substrate according to claim 11, wherein said substrate is a board, cardboard, paper or printing paper.

* * * * *